United States Patent
Sun et al.

(10) Patent No.: US 9,329,599 B1
(45) Date of Patent: May 3, 2016

(54) AUTOMATIC GUIDED VEHICLE AND METHOD FOR CONTROLLING THE SAME

(71) Applicant: Industrial Technology Research Institute, Hsin-Chu (TW)

(72) Inventors: Kuan-Chun Sun, Yunlin County (TW); Meng-Ju Han, Hsinchu (TW); Jwu-Sheng Hu, Hsinchu County (TW); Cheng-Hua Wu, Hsinchu (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 0 days.

(21) Appl. No.: 14/583,462

(22) Filed: Dec. 26, 2014

(30) Foreign Application Priority Data

Nov. 21, 2014   (TW) .............................. 103140472 A

(51) Int. Cl.
  *G01S 17/89*   (2006.01)
  *G05D 1/02*    (2006.01)

(52) U.S. Cl.
  CPC .................................. *G05D 1/0261* (2013.01)

(58) Field of Classification Search
  CPC .................................. G05D 1/02; G01S 17/89
  USPC ......................................................... 701/23
  See application file for complete search history.

(56) References Cited

U.S. PATENT DOCUMENTS

| | | | | |
|---|---|---|---|---|
| 5,189,612 A * | 2/1993 | Lemercier | ............ | G05D 1/0238 180/168 |
| 6,345,217 B1 | 2/2002 | Zeitler et al. | | |
| 6,454,036 B1 * | 9/2002 | Airey | ...................... | G01C 21/16 180/167 |
| 6,865,455 B1 * | 3/2005 | Wiegert | ............... | G05D 1/0259 324/246 |
| 8,406,949 B2 * | 3/2013 | Kondo | .................. | G05D 1/0261 701/23 |
| 8,874,283 B1 * | 10/2014 | Cavote | ................... | B64D 47/08 701/11 |
| 2008/0312823 A1 * | 12/2008 | Huang | ................... | G01C 21/32 701/532 |
| 2009/0164067 A1 * | 6/2009 | Whitehead | ........... | A01B 79/005 701/41 |
| 2012/0316722 A1 | 12/2012 | Zeitler et al. | | |

(Continued)

FOREIGN PATENT DOCUMENTS

| | | |
|---|---|---|
| CN | 201867651 U | 6/2011 |
| CN | 201993114 U | 9/2011 |
| CN | 202600484 U | 12/2012 |

(Continued)

OTHER PUBLICATIONS

B.J. Choi et al., "Tessellation of plane with magnetic landmarks for pose control and global localisation", Jul. 2010.

(Continued)

*Primary Examiner* — Thomas Tarcza
*Assistant Examiner* — Alex C Dunn
(74) *Attorney, Agent, or Firm* — WPAT, P.C.; Justin King; Douglas A. Hosack

(57) ABSTRACT

An automatic guided vehicle includes a vehicle body and a positioning identification module which being furnished in the vehicle body further includes a three-axis magnetic signal sensing unit and a logic operation processing unit. The logic operation processing unit is connected to the three-axis magnetic signal sensing unit by signal transmitted therefrom. A magnetic pointer unit is furnished adjacent to the marching route of the automatic guided vehicle. The three-axis magnetic signal sensing unit senses the magnetic field of magnetic pointer unit and generates a magnetic field information that transmits to the logic operation processing unit.

18 Claims, 11 Drawing Sheets

(56) References Cited

U.S. PATENT DOCUMENTS

| | | | | |
|---|---|---|---|---|
| 2013/0317680 | A1* | 11/2013 | Yamamura | G05D 1/0265 701/22 |
| 2015/0246290 | A1* | 9/2015 | De-Gol | A63G 31/16 701/22 |

FOREIGN PATENT DOCUMENTS

| | | |
|---|---|---|
| CN | 202694355 U | 1/2013 |
| CN | 202916689 U | 5/2013 |
| CN | 202916691 U | 5/2013 |
| CN | 103171639 | 6/2013 |
| CN | 103268119 | 8/2013 |
| CN | 103499351 A | 1/2014 |
| CN | 203465615 | 3/2014 |
| JP | 2000001318 | 1/2000 |
| JP | 2004086767 | 3/2004 |
| KR | 20110081452 A | 7/2011 |
| TW | I389635 | 3/2013 |
| TW | I439404 | 6/2013 |

OTHER PUBLICATIONS

Brandon Gozick et al., "Magnetic Maps for Indoor Navigation", IEEE Transactions on Instrumentation and Measurement, Dec. 2011, 3883-3891, 60-12.

Z.G. Man et al., "Research on RFID and Vision-based AGV Navigation", Advanced Materials Research, Oct. 2010.

I Loevsky et al., "Research and efficient landmark-based localization for mobile robots", Jan. 2010.

Won Suk You et al., "Global Localization for a Small Mobile Robot using Magnetic Patterns", May 2010.

Cornelia Buehlmann et al., "Desert Ants Learn Vibration and Magnetic Landmarks", Mar. 2012.

J. Borenstein et al., "Mobile Robot Positioning—Sensors and Techniques", Apr. 1997.

DongJu Kim et al., "Multi-robot team Outdoor Localization Using Active Marker and High Frequency Signal Sources", Oct. 2011.

* cited by examiner

AUTOMATIC GUIDED VEHICLE AND METHOD FOR CONTROLLING THE SAME

BACKGROUND OF THE INVENTION

1. Field of the Invention

The invention relates to an automatic guided vehicle and method for controlling the same, and more particularly, to an automatic guided vehicle and method for controlling the same that is capable of guiding an automatic moving carrier applied in a three-dimensional space.

2. Description of the Prior Art

The automatic guided vehicle (AGV) is widely used in the automation material transportation. The commonly seen automatic trackless guided carrier achieves the positioning objective by providing at least three furnished positions of laser reflection tags, or by burying magnetic posts under the ground, or by affixing two-dimensional bar codes on the ground.

The above-mentioned methods for providing laser reflection tags, magnetic posts or two-dimensional bar codes are used on the guided automatic moving carrier. When it comes to actual application, these modes of guidance for the moving vehicle needs clearance of site such as area clearance of at least two meters or the requirement of special treatment for the ground. This is not handy for the early stage of setting up a plant or factory without planning beforehand. In addition, the above-mentioned guidance modes are limited to two-dimensional space and are not able to apply in three-dimensional space. Therefore, the existing technology of guidance mode still has rooms for improvement.

SUMMARY OF THE INVENTION

The technology of the invention lies in providing an automatic guided vehicle that includes a vehicle body and a positioning identification module furnished at the vehicle body. The positioning identification module further includes a three-axis magnetic signal sensing unit and a logic operation processing unit connected to the three-axis magnetic signal sensing unit by signal transmitted therefrom.

A magnetic pointer unit magnetic pointer unit is furnished adjacent to the marching route of the automatic guided vehicle and the three-axis magnetic signal sensing unit senses the magnetic pointer unit and generate a magnetic field information which transmits to the logic operation processing unit to generate an identification data.

The invention further provides a controlling method of the automatic guided vehicle, including the following steps:

Sensing the magnetic field of the magnetic pointer unit from a starting end to an ending end, by the three-axis magnetic signal sensing unit, and generating a magnetic information wherein the automatic guided vehicle 10 passes the magnetic pointer unit 20, where the position of the second magnetic element and the position of the first magnetic element furnished thereof are seen to be the starting and the ending ends respectively;

receiving the digitalized magnetic information from the receiving module, by the logic operation processing unit and obtaining the turning deviation angle of the moving direction and the marching direction of the automatic guided vehicle or the distance between the automatic guided vehicle and the magnetic pointer unit;

Obtaining identification data, which is denoted by a proportion mode, by the logic operation processing unit 304, in accordance with the direction turning deviation angle of the moving direction and the marching direction information of the automatic guided vehicle 10 or the distance between the automatic guided vehicle 10 and the magnetic pointer unit 20; and Judging if the automatic guided vehicle deviates from its marching direction by comparing the identification data with the original identification data of the data base by the logic operation processing unit; if the automatic guided vehicle 10 deviates from its marching direction, then the logic operation processing unit will issue an instruction to the automatic guided vehicle to modify its marching direction, and if the automatic guided vehicle does not deviate from its marching direction, then the logic operation processing unit 304 will not perform any action.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

The following descriptions are embodiments of the invention employing some particular concrete examples. Those people skilled in the art are capable of easily realizing the advantages and efficacies of the invention through the content disclosed by the patent specification of the invention.

Figure 1:
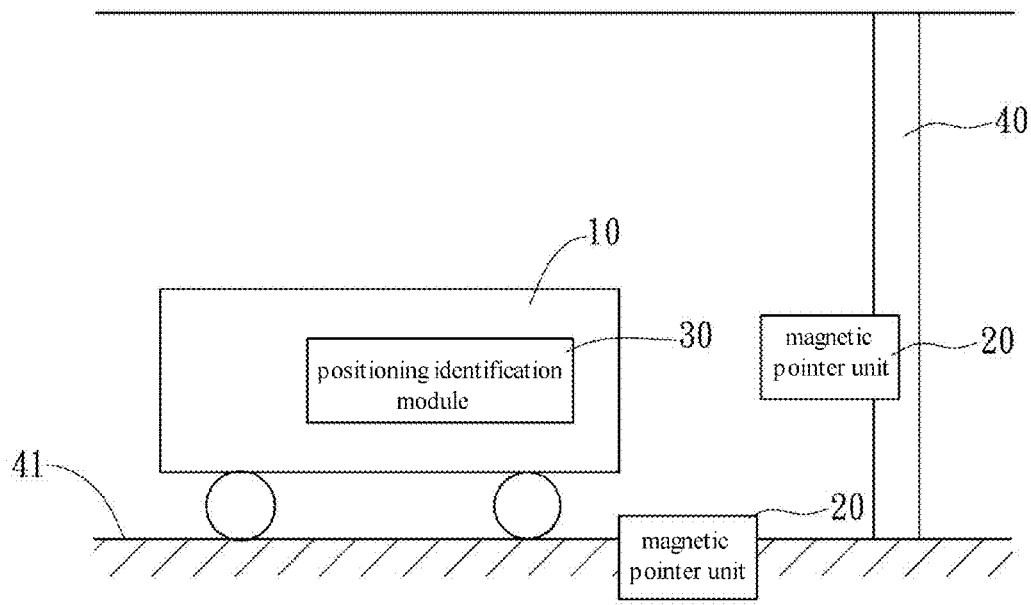
FIG. 1 is a schematic drawing of the automatic guided vehicle of the invention.
Figure 2:
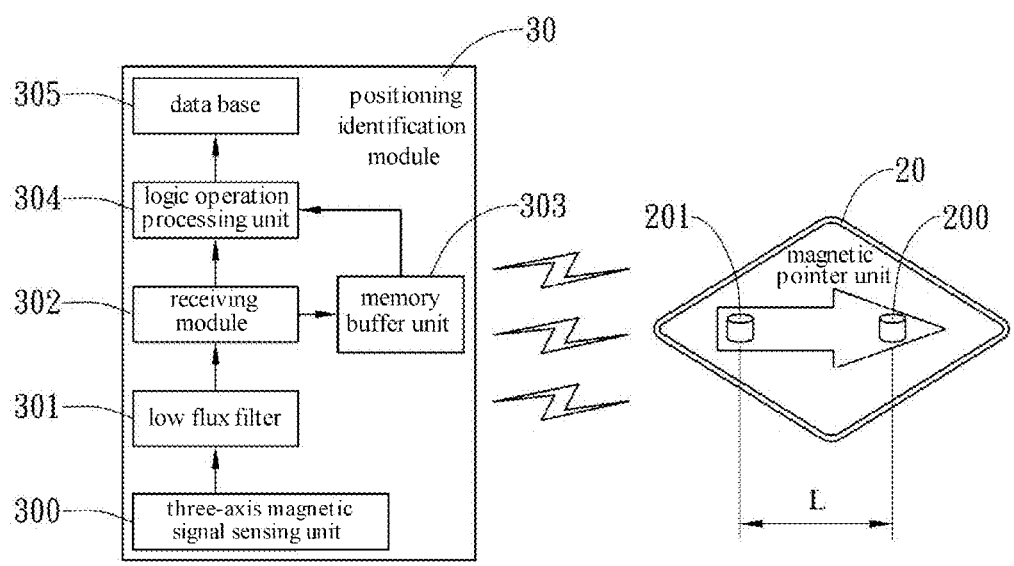
FIG. 2 is a schematic drawing of a magnetic pointer unit and a positioning identification module of the invention.

FIG. 1 is a schematic drawing of the automatic guided vehicle of the invention while FIG. 2 is a schematic drawing of a magnetic pointer unit and a positioning identification module of the invention. As shown in FIG. 1 and FIG. 2, the automatic guided vehicle 10 of the invention includes a vehicle body 100 and a positioning identification module 30. A magnetic pointer unit furnished adjacent to the moving route of the automatic guided vehicle 10 has a first magnetic element 200 having at least a magnetic member and a second magnetic element 201 also having at least a magnetic member. The magnetism of the first magnetic element 200 is different from that of the second magnetic element 201 and has a preset distance L from that of the second magnetic element 201. The length of the preset distance L is capable of determining the magnetic field strength of the magnetic pointer unit 20. The longer the preset distance L, the weaker the magnetic field strength of the magnetic pointer unit 20 it is, and the shorter the preset distance L, the stronger the magnetic field strength of the magnetic pointer unit 20 it is. The magnetic pointer unit 20 as shown in FIG. 1 is furnished on a wall 40 or on the ground 41, and the magnetic member can be a magnet or an electro-magnet. What is more, the number of magnetic member of the first magnetic element 200 is a multiple times of that of the second magnetic element 201.

The positioning identification module 30, being furnished at the vehicle body 100 of the automatic guided vehicle 10, has a three-axis magnetic signal sensing unit 300, a low flux filter 301, a receiving module 302, a memory buffer unit 303, a logic operation processing unit 304, and a data base 305.

The three-axis magnetic signal sensing unit 300, being connected to the low flux filter 301 by its signal, detects the magnetic field of the magnetic pointer unit 20 and transmits a magnetic information to the low flux filter 301 which is capable of reducing the noise of the magnetic information and enhancing the noise ratio of the magnetic information.

The receiving module 302, being connected to the low flux filter 301 by its signal, receives the magnetic information from the low flux filter 301, can be an analog/digital converter (A/D converter) or a serial peripheral interface bus, and transforms the magnetic information into a digitalized magnetic information.

The memory buffer unit 303, being connected to the receiving module 302 by its signal, receives the digitalized magnetic information from the receiving module 302 and temporarily stores the digitalized magnetic information.

The logic operation processing unit 304, being connected to the receiving module 302 and the memory buffer unit 303 by its signal, receives the digitalized magnetic information from the receiving module 302 or receives the digitalized magnetic information from the memory buffer unit 303. Thereafter, the logic operation processing unit 304 obtains an identification data in accordance with the digitalized magnetic information where the identification data is indicated by a proportion mode.

The data base 305, being connected to the logic operation processing unit 304 by its signal and having a multiplicity of original identification, determines the moving direction of the automatic guided vehicle 10 by comparing with the identification data and the original identification data.

Figure 3:
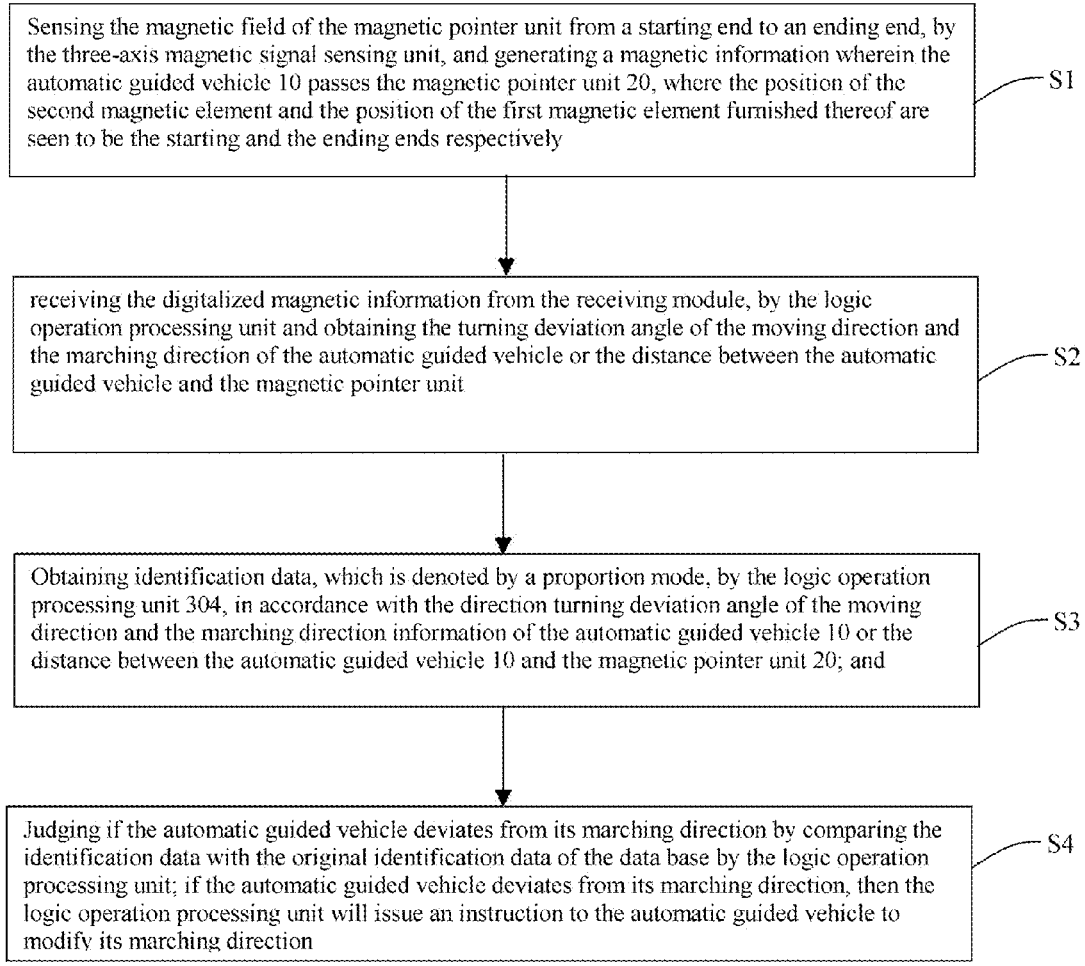
FIG. 3 is the flow chart of the controlling method of a automatic guided vehicle of the invention.

FIG. 3 is the flow chart of the controlling method of a automatic guided vehicle of the invention. As shown in FIG. 3, and FIG. 1, the controlling method of the automatic guided vehicle 10 of the invention includes the following steps:

Step 1: Sensing the magnetic field of the magnetic pointer unit 20 from a starting end to an ending end, by the three-axis magnetic signal sensing unit 300, generating magnetic information, and transmitting the magnetic information to the low flux filter 301 which is capable of reducing the noise of the magnetic information and enhancing the noise ratio of the magnetic information; receiving the magnetic information from the low flux filter 301, by the receiving module 302, and transforming the magnetic information into a digitalized magnetic information as shown in FIG. 1 and FIG. 2, wherein the automatic guided vehicle 10 passes the magnetic pointer unit 20 where the position of the second magnetic element 201 and the position of the first magnetic element 200 furnished thereof are seen to be the starting and the ending ends respectively, and where the low flux filter 301 is capable of reducing the noise of the magnetic information and enhancing the noise ratio of the magnetic information.

Step 2: receiving the digitalized magnetic information from the receiving module 302, by the logic operation processing unit 304, storing temporarily by the memory buffer unit 303 and waiting for the processing by the logic operation processing unit 304, obtaining the turning deviation angle of the moving direction and the marching direction of the automatic guided vehicle 10 or the distance between the automatic guided vehicle 10 and the magnetic pointer unit 20 if the logic operation processing unit 304 is in busy status.

Figure 4:
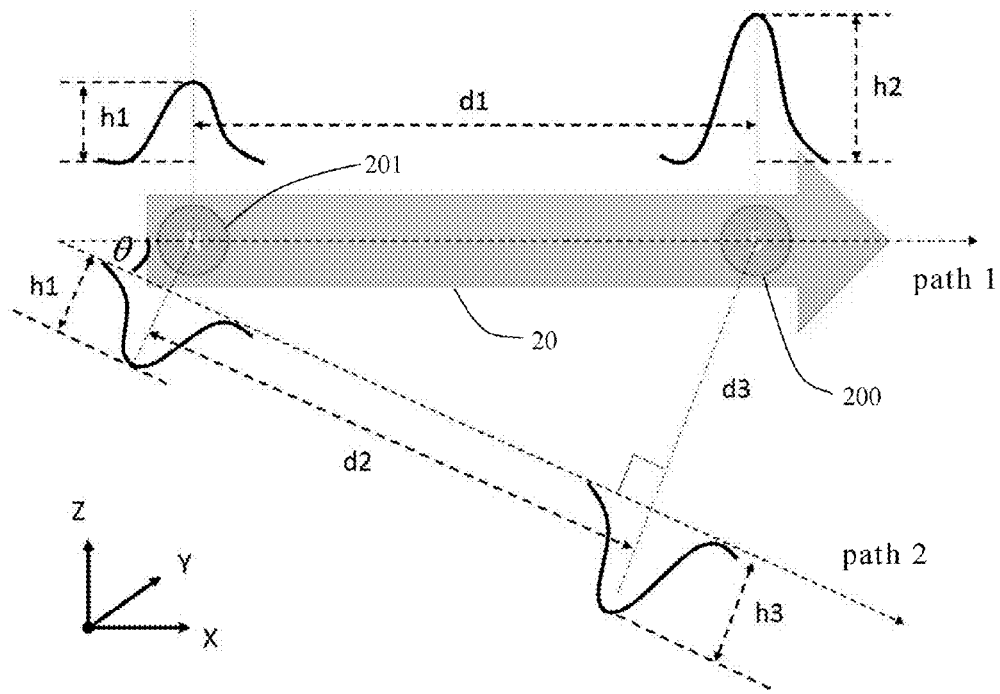
FIG. 4 is a schematic drawing of the sense monitoring method of a magnetic pointer unit of the invention.

The processing modes of the logic operation processing unit 304 can be the ones that make use of the facts that (1). the energy strength is inversely proportional to the square of the distance, or (2). the information provided by an encoder, or (3). the inversely inferred distance and direction of the magnet spacing of the connected line between the magnetic members. These processing modes are depicted in detail as follows:

(1). The mode making use of the fact that the energy strength is inversely proportional to the square of the distance:

As shown in FIG. 4, according to the trigonometric function, it is known that $d3=d1*\sin(\theta)$, where d1 is the moving distance of Path 1, i.e. it is the moving distance of the path as the automatic guided vehicle 10 moves from the second magnetic element 201 to the first magnetic element 200 while d3 is the perpendicular distance between the automatic guided vehicle 10 and the first magnetic element 200, i.e. the distance between the automatic guided vehicle 10 and magnetic pointer unit 20, θ is the included angle between d1 and d2, i.e. the angle of the turning deviation angle of the moving direction of the automatic guided vehicle 10, d2 is the moving distance of Path 2, i.e. it is the moving distance of the path as the automatic guided vehicle 10 moves from the second magnetic element 201 to the first magnetic element 200, these are the moving direction information of the automatic guided vehicle 10.

h2 and h3 being the energy peak values are the magnetic field strengths of the first magnetic element 200 sensed on the path 1 and path 2 respectively by the three-axis magnetic signal sensing unit 300 while h1 is the magnetic field strength of the second magnetic element 201 sensed on the path 1 or path 2 respectively by the three-axis magnetic signal sensing unit 300. The quotient of h2/h3 (h2 divided by h3) is inversely proportional to the square of d3, i.e. h2/h3=1/(d3)$^2$°h1, h2 and h3 can also be deemed as the digitalized magnetic field information of the above-mentioned values.

Moreover, the θ value can be obtained from the relationship h2/h3=1/(d3)$^2$ and d3=d1*sin(θ), i.e. the deviated angle of the automatic guided vehicle 10 relative to the path 1 where the θ values are the identification data of the above-mentioned ones.

(2). The mode making use of the information provided by the encoder of the automatic guided vehicle 10:

As shown in FIG. 4, the automatic guided vehicle can provide a distance information, i.e. the automatic guided vehicle 10 has a wheel-and-axle encoder furnished thereof. The wheel-and-axle encoder can detect the moving distance of the automatic guided vehicle 10 and the value of the angle θ can be calculated through the trigonometric function d2=d1*cos (θ).

Figure 5:
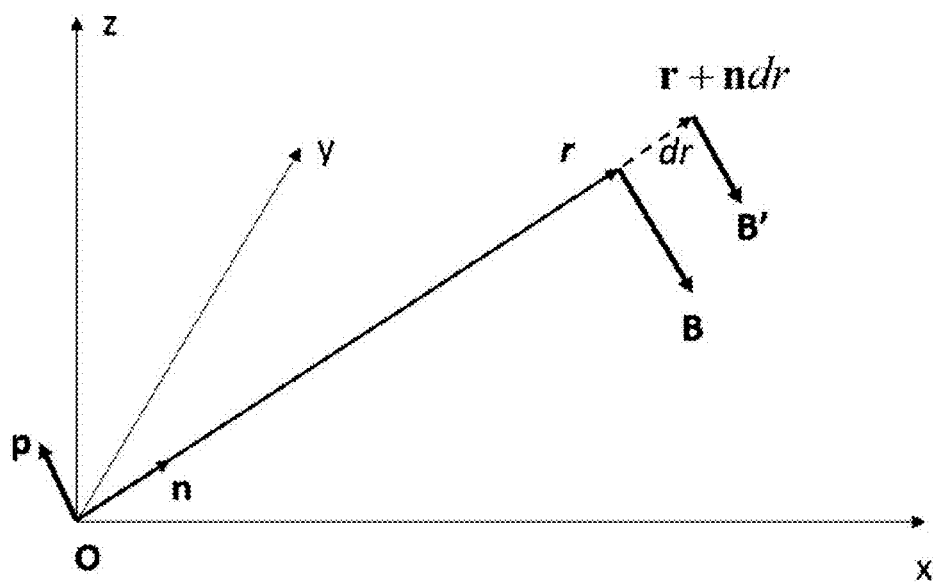
FIG. 5 is a schematic drawing of the vector of magnetic-moment-reverse-inferred distance and direction of the invention.

(3). The mode making use of the inversely inferred distance and direction of the magnet spacing of the connected line between the magnetic members:

As shown in FIG. 5, the origin O can be deemed to be the position of the magnetic pointer unit 20, r is the distance between the automatic guided vehicle 10 and the magnetic pointer unit 20, B is the magnetic flux detected at r by the three-axis magnetic signal sensing unit 300 while B' is the magnetic flux detected at another distance r+ndr between the automatic guided vehicle 10 and the magnetic pointer unit 20 where n the unit vector, dr is the differential distance or an encoder the following formulas $$B = \frac{\mu_0}{4\pi} \frac{3(p \cdot n)n - p}{r^3}$$

$$B' = \frac{\mu_0}{4\pi} \frac{3(p \cdot n)n - p}{(r+dr)^3}$$

The above-mentioned formulas can be simplified as follows $$B - B' = \frac{\mu_0}{4\pi}(3(p \cdot n)n - p) \frac{\partial}{\partial r} \frac{1}{r^3} dr \approx -\frac{3}{r} B dr$$

The above-mentioned formulas is a magnetic flux differential value that can be denoted by a gradient vector as follows:

$$B - B' = \begin{pmatrix} \nabla B_x \cdot ndr \\ \nabla B_y \cdot ndr \\ \nabla B_z \cdot ndr \end{pmatrix} = \begin{pmatrix} \partial_x B_x & \partial_y B_x & \partial_z B_x \\ \partial_x B_y & \partial_y B_y & \partial_z B_y \\ \partial_x B_z & \partial_y B_z & \partial_z B_z \end{pmatrix}$$

and the following formulas can be obtained according to the above-mentioned formulas:

$$r = -3 \cdot \begin{pmatrix} \partial_x B_x & \partial_y B_x & \partial_z B_x \\ \partial_x B_y & \partial_y B_y & \partial_z B_y \\ \partial_x B_z & \partial_y B_z & \partial_z B_z \end{pmatrix}^{-1} \begin{pmatrix} B_x \\ B_y \\ B_z \end{pmatrix}$$

It is known from the above-mentioned formulas that if the magnetic flux and the gradient vector matrix are obtained, its coordinates can be inversely inferred, i.e. the actual position of the automatic guided vehicle 10. The above-mentioned formulas can further obtain the following formulas by the use of Kalman Filter:

$$x = [p^T \; r]^T$$

$$x(k+1) = \Phi x(k) + w(k)$$

$$y(k) = h(x(k)) + v(k)$$

and can be renewed by measuring:

$$\tilde{y}(k) = y(k) - h(\hat{x}^-(k))$$

$$S(k) = H(k)P^-(k)^{-1}H(k)^T + R$$

$$K(k) = P^-(k)H(k)^T S(k)^{-1}$$

$$\hat{x}(k) = \hat{x}^-(k) + K(k)\tilde{y}(k)$$

$$P^+(k) = (I - K(k)H(k))P^-(k)$$

and can be renewed by time:

$$\hat{x}^-(k+1) = \phi \hat{x}^+(k)$$

$$P^-(k) = \phi P^+(k)\phi^T + Q$$

where x, y are the status and measuring vectors respectively; k is the time parameter; φ is the linear system matrix; p is the magnetic matrix; r is the distance to the origin; P−, P+ are the status error covariance matrixes; h is the measuring equation; H is the Jacobian matrix of h; Q and R are the noise covariance matrixes; w and v are the zero mean-value white Gaussian noise.

As shown in FIG. 4 and as the foregoing description, the automatic guided vehicle 10 will senses a first peak value h1 as it passes the second magnetic element 201. At this moment, the distance between the automatic guided vehicle 10 and the second magnetic element 201 is the shortest in accordance with the geometric relation.

Figure 6:
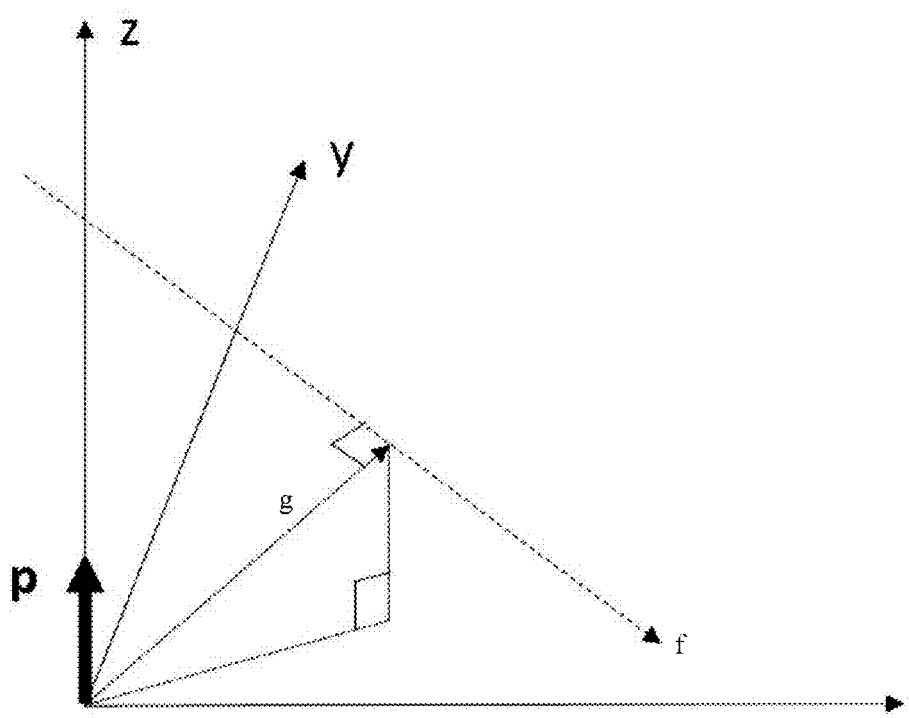
FIG. 6 is a schematic drawing of the another vector of magnetic-moment-reversely-inferred distance and direction of the invention.

FIG. 6 is a schematic drawing of the another vector of magnetic-moment-reversely-inferred distance and direction of the invention. As shown in FIG. 1, since the ground 41 is on the X-Y plane-axis is perpendicular to the X-Y plane, as shown in FIG. 6, as the automatic guided vehicle 10 passes the magnetic pointer unit 20, the marching direction f of the automatic guided vehicle 10 is perpendicular to the direction of the coordinate g, thereby, a vector n can be obtained.

Furthermore, a magnetic flux B, and a magnet spacing p in z-axis direction can be obtained from the three-axis magnetic signal sensing unit 300 and Kalman filter respectively. Finally, a position vector r can be obtained by applying the above-mentioned B, n, and p in the above-mentioned formula.

Figure 7:
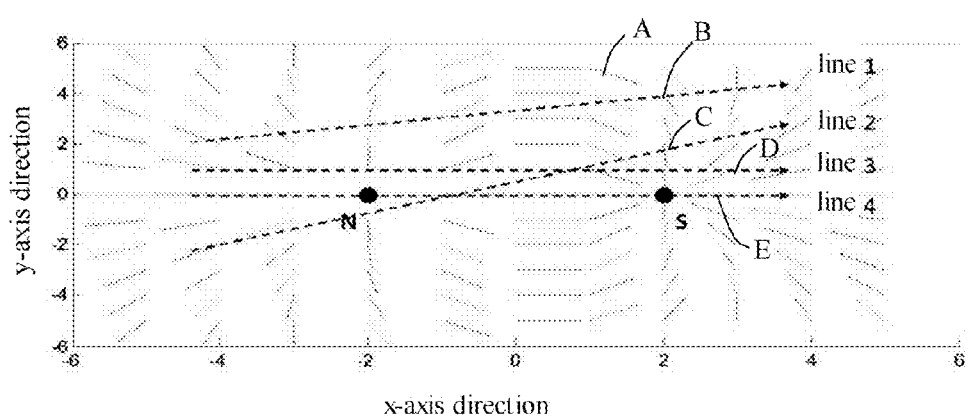
FIG. 7 is a schematic drawing of the four paths when the automatic guided vehicle passes a magnetic pointer unit of the invention.

FIG. 7 is a schematic drawing of the four paths when the automatic guided vehicle passes a magnetic pointer unit of the invention. For further description, as shown in FIG. 7, as the automatic guided vehicle 10 passes the second magnetic element 201 and first magnetic element 200 of the magnetic pointer unit 20, there are four possible paths line 1B, line 2C, line 3D, and line 4E where there is a magnetic force line A between the second magnetic element 201 and first magnetic element 200.

Figure 8A:
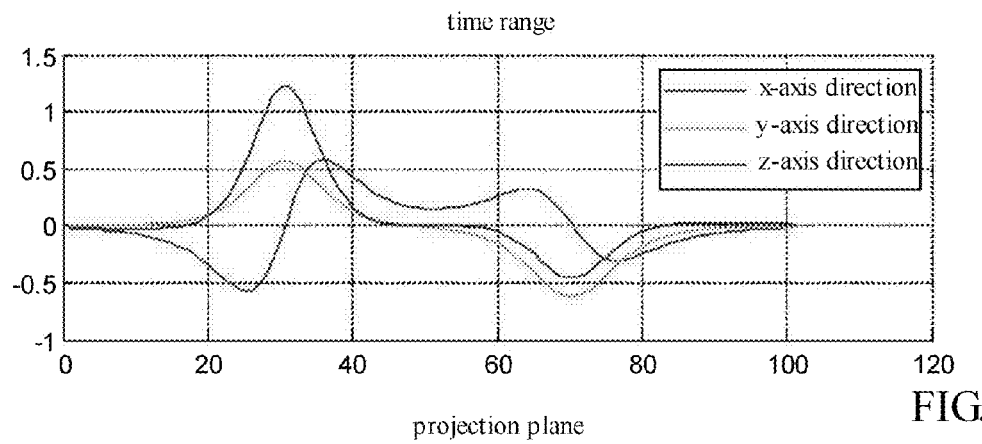
FIG. 8A is a schematic drawing of the time range of the line 1 of the invention.
Figure 9A:
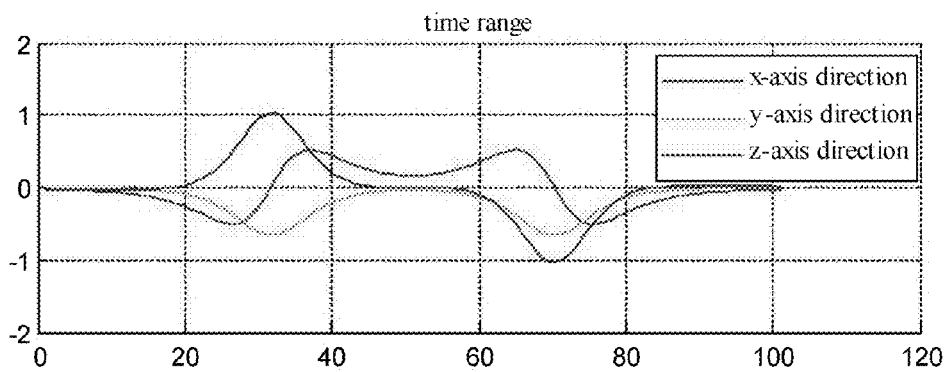
FIG. 9A is a schematic drawing of the time range of the line 2 of the invention.
Figure 10A:
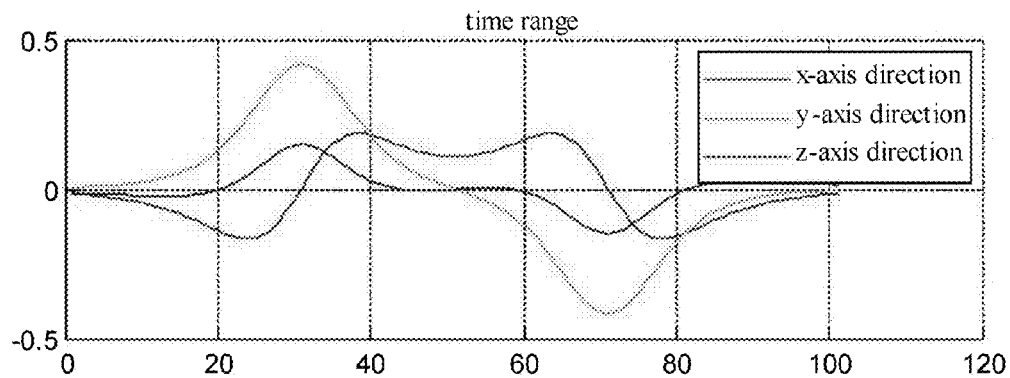
FIG. 10A is a schematic drawing of the time range of the line 3 of the invention.
Figure 11A:
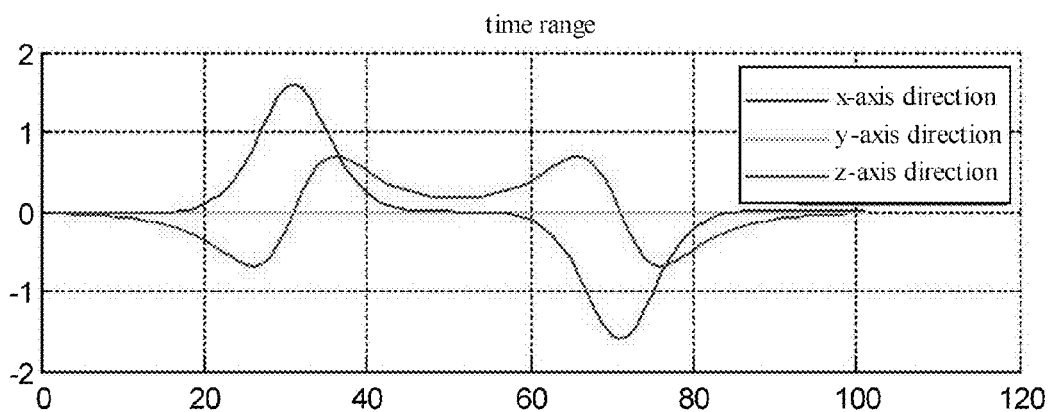
FIG. 11A is a schematic drawing of the time range of the line 4 of the invention.

FIG. 8A is a schematic drawing of the time range of the line 1 of the invention, FIG. 9A is a schematic drawing of the time range of the line 2 of the invention, FIG. 10A is a schematic drawing of the time range of the line 3 of the invention, while FIG. 11A is a schematic drawing of the time range of the line 4 of the invention. As shown in FIG. 8A, FIG. 9A, FIG. 10A, and FIG. 11A, as the path of the automatic guided vehicle 10 is line 1B, line 2C, line 3D, or line 4E, and the magnetic pole of the second magnetic element 201 is N pole while the magnetic pole of the first magnetic element 200 is S pole, the magnet spacing value in the Z-axis direction is positive first and negative next since the Z-axis is pertinent to the magnetism of the magnetic pointer unit 20.

In the Y-axis direction, if the automatic guided vehicle 10 passes the center line between the second magnetic element 201 and the first magnetic element 200, then the magnet spacing value in the Y-axis is either a constant positive or a constant negative. If the automatic guided vehicle 10 does not pass the center line between the second magnetic element 201 and the first magnetic element 200, then the magnet spacing value in the Y-axis is one positive and one negative. Furthermore, if the marching path of the automatic guided vehicle 10 drops on the center line, then the magnet spacing value in Y-axis direction is zero. Therefore, in Y-axis direction, the magnitude of the magnet spacing value appears to be proportional to the marching deviated value.

Figure 8B:
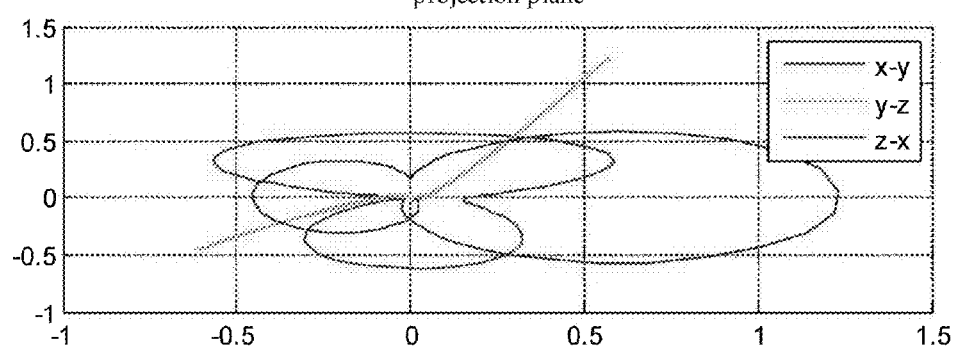
FIG. 8B is a schematic drawing of the projection plane of the line 1 of the invention.
Figure 8C:
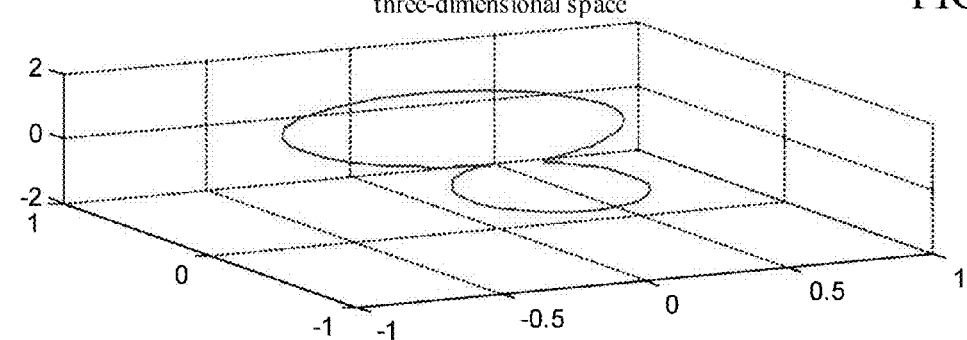
FIG. 8C is a schematic drawing of the three-dimensional space of the line 1 of the invention.
Figure 9B:
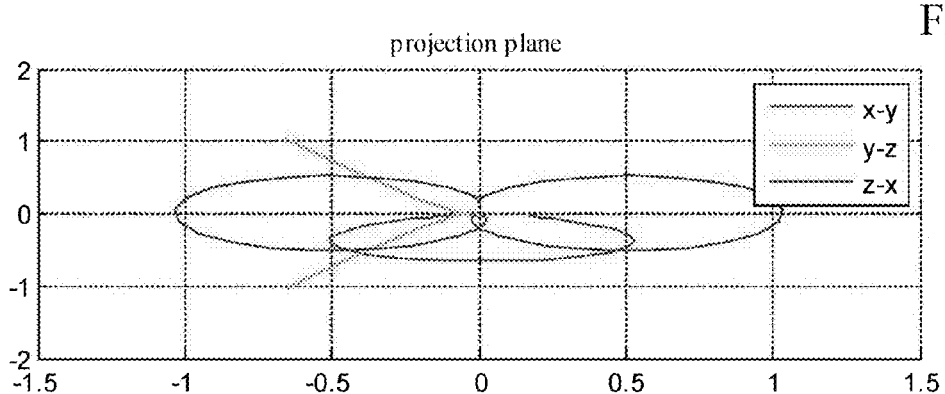
FIG. 9B is a schematic drawing of the projection plane of the line 2 of the invention.
Figure 9C:
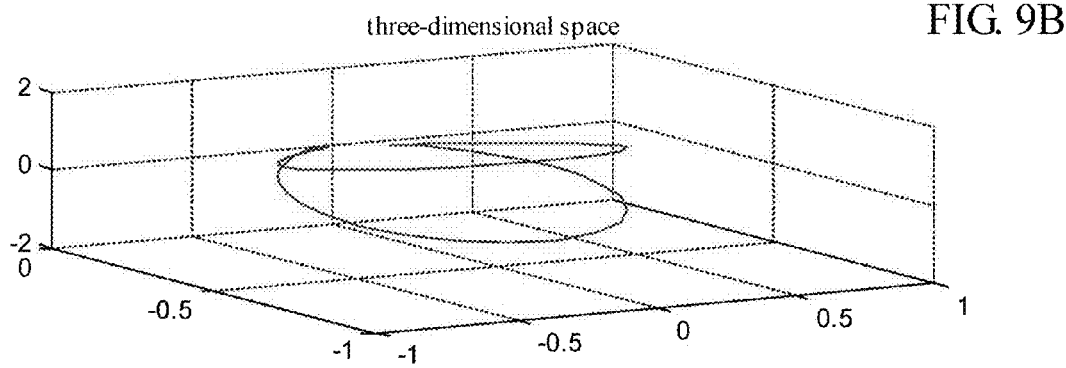
FIG. 9C is a schematic drawing of the three-dimensional space of the line 2 of the invention.
Figure 10B:
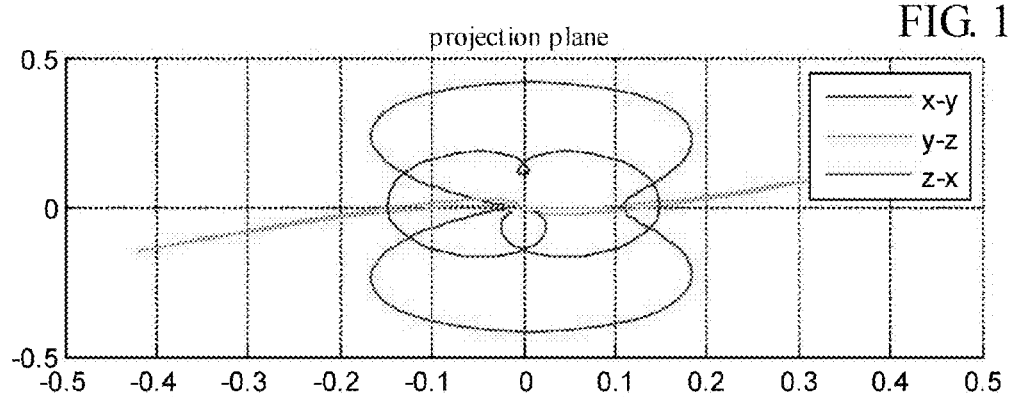
FIG. 10B is a schematic drawing of the projection plane of the line 3 of the invention.
Figure 10C:
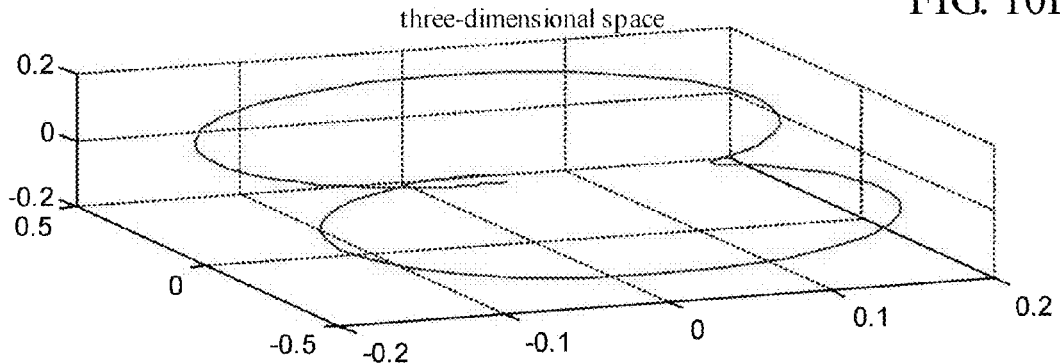
FIG. 10C is a schematic drawing of the three-dimensional space of the line 3 of the invention.
Figure 11B:
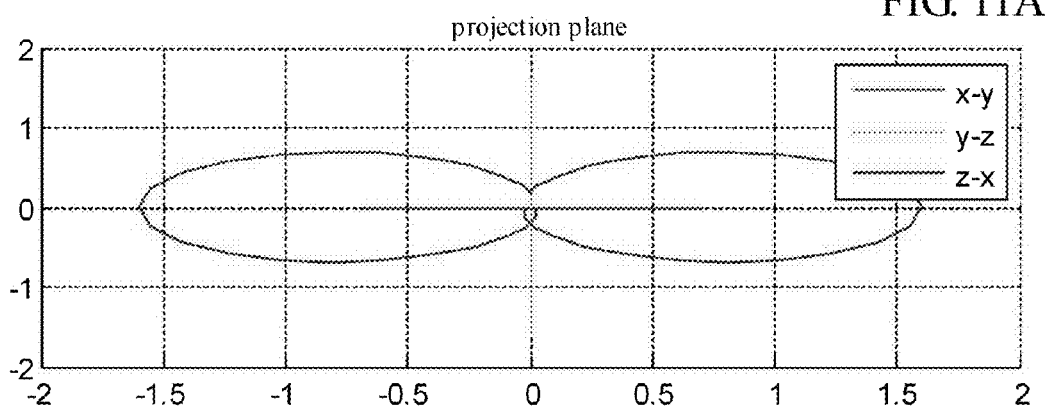
FIG. 11B is a schematic drawing of the projection plane of the line 4 of the invention.
Figure 11C:
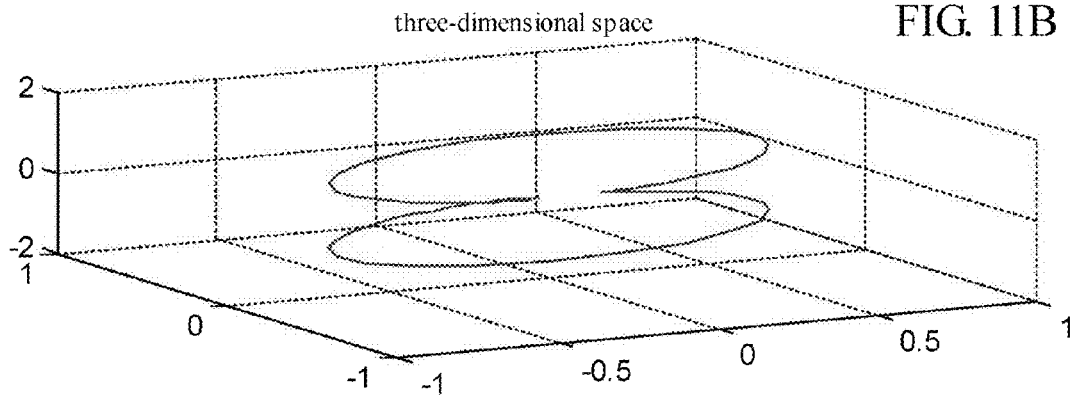
FIG. 11C is a schematic drawing of the three-dimensional space of the line 4 of the invention.

FIG. 8B is a schematic drawing of the projection plane of the line 1 of the invention, FIG. 8C is a schematic drawing of the three-dimensional space of the line 1 of the invention, FIG. 9B is a schematic drawing of the projection plane of the line 2 of the invention, FIG. 9C is a schematic drawing of the three-dimensional space of the line 2 of the invention, FIG. 10B is a schematic drawing of the projection plane of the line 3 of the invention, FIG. 10C is a schematic drawing of the three-dimensional space of the line 3 of the invention, FIG. 11B is a schematic drawing of the projection plane of the line 4 of the invention, and FIG. 11C is a schematic drawing of the three-dimensional space of the line 4 of the invention. As shown in FIG. 8B, FIG. 8C, FIG. 9B, FIG. 9C, FIG. 10B, FIG. 10C, and FIG. 11B, FIG. 11C, it is known from the above-mentioned Figures that which axial direction of the magnetic pointer unit 20 is belong to, and whether it is a clockwise or a counter-clockwise construction from the cross-product of the Figures in order to determine which direction the automatic guided vehicle 10 passes the magnetic pointer unit 20.

Step 3: Obtaining identification data, which is denoted by a proportion mode, by the logic operation processing unit 304, in accordance with the direction turning deviation angle of the moving direction and the marching direction information of the automatic guided vehicle 10 or the distance between the automatic guided vehicle 10 and the magnetic pointer unit 20.

Step 4: Judging if the automatic guided vehicle 10 deviates from its marching direction by comparing the identification data with the original identification data of the data base 305 by the logic operation processing unit 304; if the automatic guided vehicle 10 deviates from its marching direction, then the logic operation processing unit 304 will issue an instruction to the automatic guided vehicle 10 to modify its marching direction, and if the automatic guided vehicle 10 does not deviate from its marching direction, then the logic operation processing unit 304 will not perform any action.

Figure 12A:
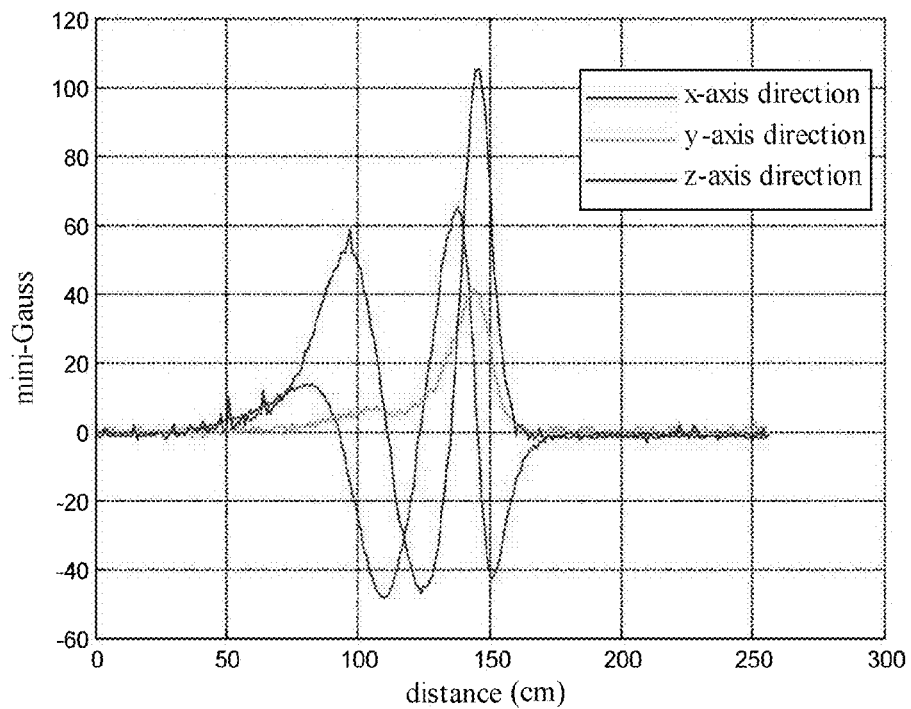
FIG. 12A is a schematic drawing of the measured result when a three-axis magnetic signal sensing unit passes a magnetic pointer unit of the invention.
Figure 12B:
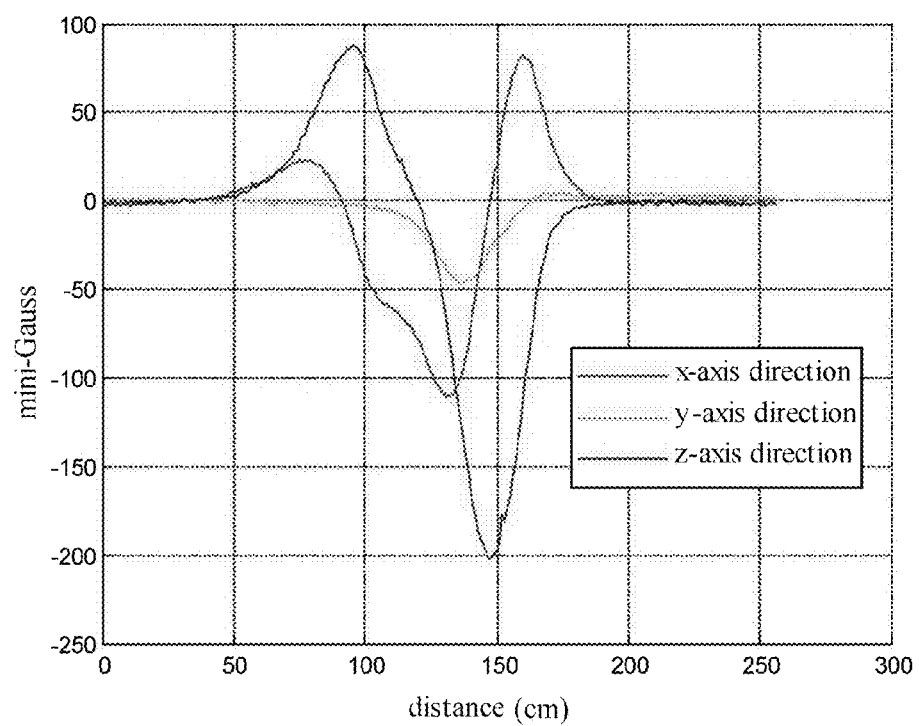
FIG. 12B is a schematic drawing of the measured result when another three-axis magnetic signal sensing unit passes a magnetic pointer unit of the invention.

FIG. 12A is a schematic drawing of the measured result when a three-axis magnetic signal sensing unit passes a magnetic pointer unit of the invention while FIG. 12B is a schematic drawing of the measured result when another three-axis magnetic signal sensing unit passes a magnetic pointer unit of the invention. As shown in FIG. 12A and FIG. 12B, the magnetic pointer unit 20 is furnished on the ground 41 with its starting end having a unit of N-pole magnetic source, and with its ending end having 2 units of S-pole of magnetic source. For example, the starting end is the position where the second magnetic element 201 is located and the ending end is the position where the first magnetic element 200 is located where the second magnetic element 201 has one magnetic, two magnets, three magnets or N magnets wherein N is a constant and is greater than one, and the first magnetic element 200 has two magnetic, four magnets, six magnets or 2N magnets.

As shown in FIG. 12A, there are two maximum magnetic force peak values in Z-axis, one is 60 mG (mini-Gauss) while the other one is 110 mG. It is known from the Figure that the magnetic pointer unit 20 is furnished on the ground 41, and the first magnetic element 200 has 2N magnets while the second magnetic element 201 has N magnets.

As shown in FIG. 12B, there are two maximum magnetic force peak values in Z-axis, one is 90 mG (mini-Gauss) while the other one is 200 mG. It is known from the Figure that the magnetic pointer unit 20 is furnished on the ground 41, and the first magnetic element 200 has 2N magnets while the second magnetic element 201 has N magnets. Therefore, one can verify the permutation and combination of the magnetic pole and magnetic strength from FIG. 8A and FIG. 8B to denote the serial number, direction, or position.

Figure 13A:
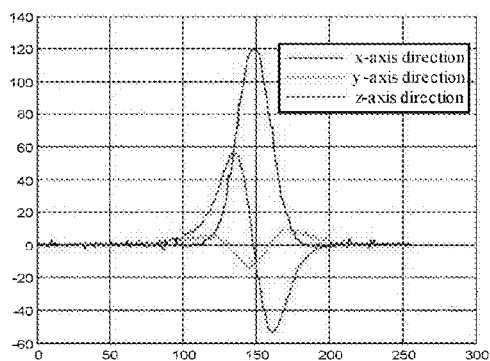
FIG. 13A is a schematic drawing of the sensing signal and the energy distribution of a three-axis magnetic signal sensing unit of the invention.
Figure 13B:
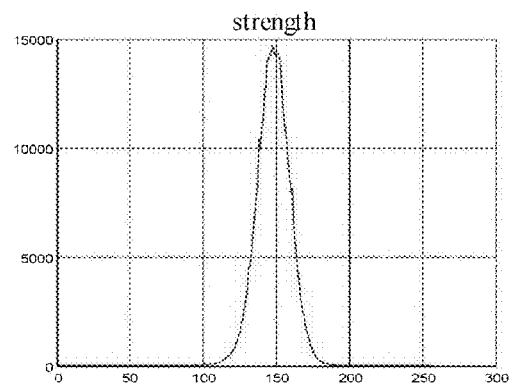
FIG. 13B is a schematic drawing of the sensing signal and the energy distribution of another three-axis magnetic signal sensing unit of the invention.

FIG. 13A is a schematic drawing of the sensing signal and the energy distribution of a three-axis magnetic signal sensing unit of the invention while FIG. 13B is a schematic drawing of the sensing signal and the energy distribution of another three-axis magnetic signal sensing unit of the invention. As shown in FIG. 13A, FIG. 13B and FIG. 1, including a three-axis magnetic signal sensing unit 300 and a magnetic pointer unit 20, wherein the magnetic pointer unit 20 is furnished on the wall 40, and the three-axis magnetic signal sensing unit 300 senses the magnetic pointer unit 20. The maximum peak value shown in FIG. 13A shows that the three-axis magnetic signal sensing unit 300 is capable of sensing the magnetic pointer unit 20 that has the strongest magnetic field in Z-axis.

Figure 14A:
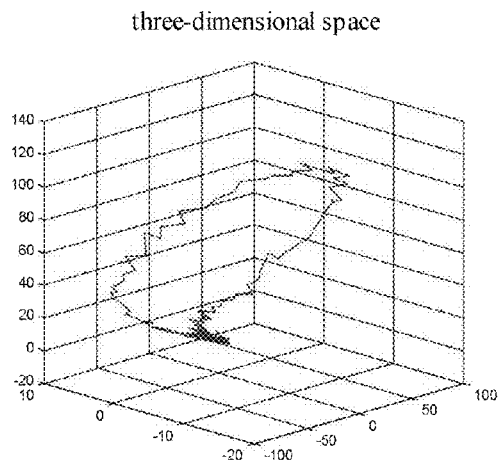
FIG. 14A is a schematic drawing of the magnetic force distribution in a three-dimensional space of the invention.
Figure 14B:
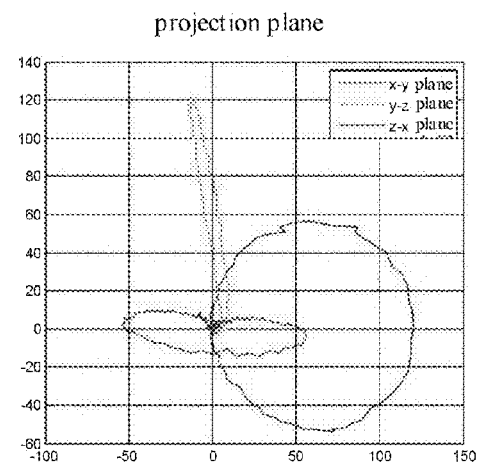
FIG. 14B is a schematic drawing of projection plane of the magnetic force of the invention.

FIG. 14A is a schematic drawing of the magnetic force distribution in a three-dimensional space of the invention while FIG. 14B is a schematic drawing of projection plane of the magnetic force of the invention. As shown in FIG. 14A and FIG. 14B, the magnitude of the area of the projected circle plane is capable of determining the relative relation between the magnetic source (magnetic pointer unit 20) and magnetic force gauge (three-axis magnetic signal sensing unit 300) that can be informed of whether the magnetic pointer unit 20 is furnished on a wall 40 or on the ground 41 as shown in FIG. 1.

Figure 15:
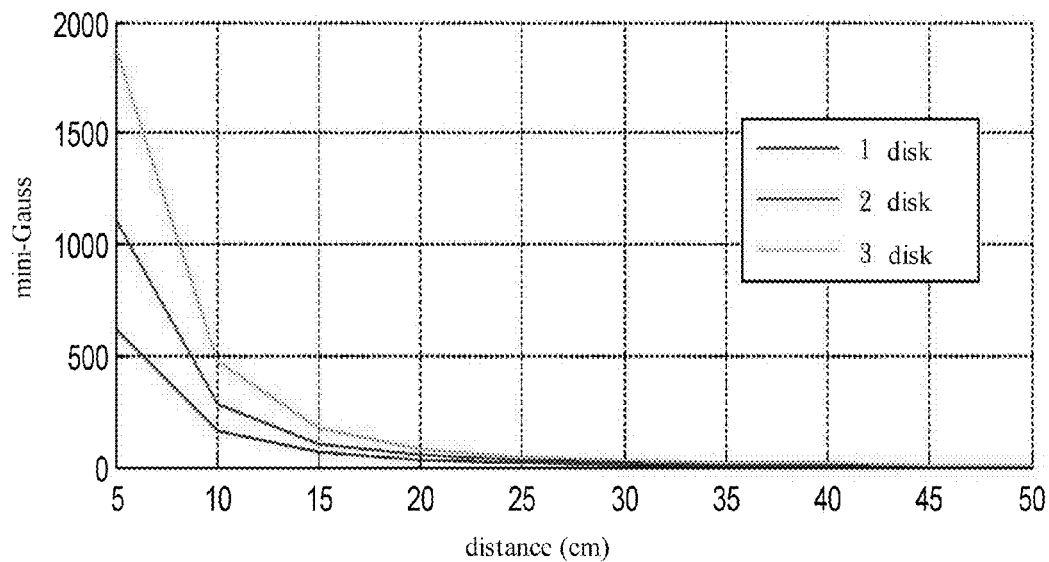
FIG. 15 is a schematic drawing of the measured result of the magnetic field strength and magnetic distance of a multi-set of the first magnetic element and the second magnetic element of the invention.

FIG. 15 is a schematic drawing of the measured result of the magnetic field strength and magnetic distance of a multi-set of the first magnetic element and the second magnetic element of the invention. As shown in FIG. 15, if there is a preset distance between the three-axis magnetic signal sensing unit 300 and the at least a magnet, the three curves arranged from top to bottom are four magnets, two magnets, and one magnet respectively relative to the testing results of the magnetic field strength and distance of the three-axis magnetic signal sensing unit 300. It can be seen from the Figure that the more number of the magnet, the stronger the magnetic field it is relative to the three-axis magnetic signal sensing unit 300, and the energy is exponentially decreased according to the its relative distance.

Figure 16:
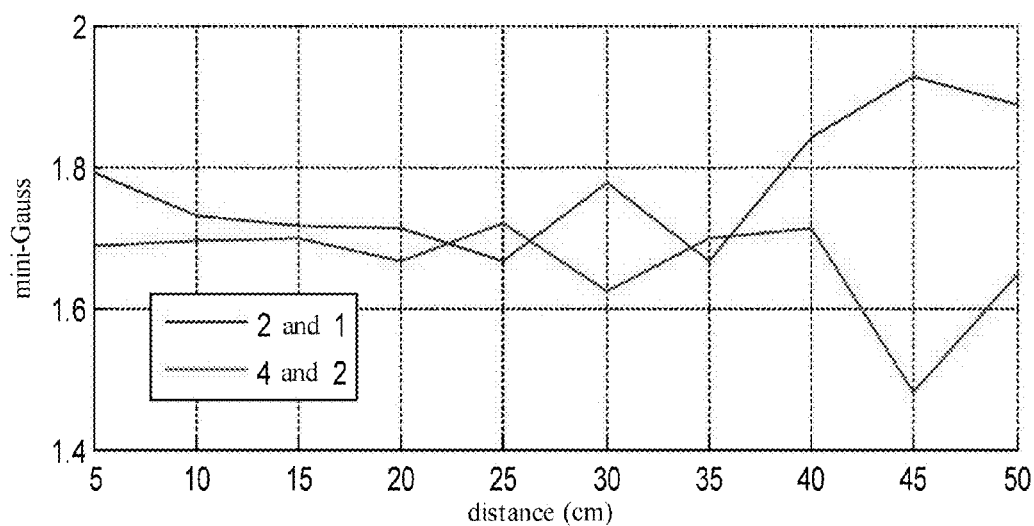
FIG. 16 is a schematic drawing of the ratio value relationship of the magnetic field strength of a multi-set magnet number (ratio value is set to be 2 to 1) of the invention.

FIG. 16 is a schematic drawing of the ratio value relationship of the magnetic field strength of a multi-set magnet number (ratio value is set to be 2 to 1) of the invention. As shown in FIG. 16, the upper curve denotes that the first magnetic element 200 has two magnets and the second magnetic element 201 has only one magnet while the lower curve denotes that the first magnetic element 200 has four magnets and the second magnetic element 201 has two magnets.

In the sense of having the ratio tolerance within 0.2, in the case of the above-mentioned combination of having two magnets and one magnet, it is unable to estimate when the three-axis magnetic signal sensing unit 300 exceeds a predetermined distance, for example, the predetermined distance is, but not limited to, 35 cm.

In the case of the above-mentioned combination of having four magnets and two magnets, it is unable to estimate when the three-axis magnetic signal sensing unit 300 exceeds a predetermined distance, for example, the predetermined distance is, but not limited to, 40 cm. Enhancing the strength of magnetism is necessary if the service distance is required to increased.

In conclusion, the above-mentioned magnetic pointer unit 20 of the invention can resolve the problem of limited assembling space since the magnetic pointer unit 20 can be placed arbitrarily in a three-dimensional space such as the wall or the ground.

In addition, since the direction of the preset sense of the magnetic pointer unit 20 is a three-dimensional space, the guiding and positioning are not limited to the existing technique of the two-dimensional plane. Therefore, it can be guidance for arbitrary direction or reference for positioning.

Moreover, since the identification encoding of the magnetic pointer unit 20 employs multiplying factor calculation between the two peak values which are the above-mentioned h1, h2, or h3, the magnetic pointer unit 20 is able to avoid the use of the magnetic member such as a magnet which is unable to be interpreted due to the magnetic attenuation after using for a period of time. The magnetic pointer unit 20 can maintain a fixed multiplying factor since the number of the first magnetic element 200 is a multiple times of the number of the second magnetic element 201. Since the anti-noise capability of the invention is higher than those of the existing ones which employ absolute magnetic force strength, thereby the misinterpretation can be reduced.

It will become apparent to those people skilled in the art that various modifications and variations can be made to the structure of the invention without departing from the scope or spirit of the invention. In view of the foregoing description, it is intended that all the modifications and variation fall within the scope of the following appended claims and their equivalents.

What is claimed is:

1. An automatic guided vehicle, comprising:
a vehicle body; and
a positioning identification module furnished at the vehicle body, further comprising:
a three-axis magnetic signal sensing unit; and
a logic operation processing unit connected to the three-axis magnetic signal sensing unit by signal transmitted therefrom;
wherein a magnetic pointer unit is furnished adjacent to the marching route of the automatic guided vehicle and the three-axis magnetic signal sensing unit senses the magnetic pointer unit and generates a magnetic field information which transmits to the logic operation processing unit to generate an identification data.

2. The automatic guided vehicle as claimed in claim 1, wherein the magnetic pointer unit has a first magnetic element and a second magnetic element as well as a preset distance between them.

3. The automatic guided vehicle as claimed in claim 2, wherein the first magnetic element has at least a magnetic member and the second magnetic element has at least a magnetic member.

4. The automatic guided vehicle as claimed in claim 2, wherein the number of magnetic members of the first magnetic element is a multiple of the number of the magnetic members of the second magnetic element.

5. The automatic guided vehicle as claimed in claim 1, wherein the positioning identification module has a low flux filter which connects the three-axis magnetic signal sensing unit and the logic operation processing unit by the signal transmitted therefrom.

6. The automatic guided vehicle as claimed in claim 5, wherein the low flux filter receives the magnetic signal of the three-axis magnetic signal sensing unit and reduces the noise of the magnetic field information to enhance noise ratio of the magnetic field signal.

7. The automatic guided vehicle as claimed in claim 5, wherein the positioning identification module further has a receiving module which receives connects the low flux filter and the logic operation processing unit by the signal transmitted therefrom.

8. The automatic guided vehicle as claimed in claim 7, wherein the receiving module receives the magnetic field information of the low flux filter to transform the magnetic field information into a digitalized magnetic field information.

9. The automatic guided vehicle as claimed in claim 7, wherein the receiving module is an analog/digital converter or a serial peripheral interface bus.

10. The automatic guided vehicle as claimed in claim 7, wherein the positioning identification module further has a memory buffer unit that connects the receiving module and logic operation processing unit by the signal transmitted therefrom.

11. The automatic guided vehicle as claimed in claim 10, wherein the memory buffer unit receives the digitalized magnetic field information of the receiving module and temporarily store the digitalized magnetic field information.

12. The automatic guided vehicle as claimed in claim 10, wherein the positioning identification module further has a data base that connects the logic operation processing unit by signal transmitted therefrom.

13. The automatic guided vehicle as claimed in claim 12, wherein the data base has a multiplicity of original identification data, and the logic operation processing unit is employed to compare the identification data with the original identification data to determine the marching direction of the automatic guided vehicle.

14. The automatic guided vehicle as claimed in claim 1, wherein the automatic guided vehicle is an automatic moving carrier.

15. A controlling method of the automatic guided vehicle, comprising the following steps:

sensing a magnetic field of a magnetic pointer unit from a starting end to an ending end by a three-axis magnetic signal sensing unit;

generating digitalized magnetic information wherein the automatic guided vehicle passes the magnetic pointer unit, where the position of the second magnetic element and the position of the first magnetic element furnished thereof are seen to be the starting and the ending ends respectively;

receiving the digitalized magnetic information from a receiving module, by a logic operation processing unit and obtaining a turning deviation angle of the moving direction and the marching direction of the automatic guided vehicle or the distance between the automatic guided vehicle and the magnetic pointer unit;

obtaining identification data by the logic operation processing unit in accordance with the turning deviation angle between the moving direction and the marching direction information of the automatic guided vehicle or the distance between the automatic guided vehicle and the magnetic pointer unit; and judging whether the automatic guided vehicle deviates from its marching direction by comparing the identification data with an original identification data of a data base by the logic operation processing unit;

issuing an instruction by the logic operation processing unit to the automatic guided vehicle to modify its marching direction if the automatic guided vehicle deviates from its marching direction.

16. The controlling method of the automatic guided vehicle as claimed in claim 15, wherein the magnetic pointer unit has a first magnetic element, a second magnetic element, and a preset distance between them; the position of the first magnetic element is the ending end and the position of the second magnetic element is the starting end.

17. The controlling method of the automatic guided vehicle as claimed in claim 15, wherein the logic operation processing unit makes use of the modes that (1) the relationship that the energy strength is inversely proportional to the square of the distance; (2) the information provided by the encoder of the of the automatic guided vehicle; (3) inversely infer the distance and direction by utilizing the magnet spacing of the connecting line of the magnetic elements to obtain the turning deviation angle of the moving direction of the automatic guided vehicle, the marching direction information of the automatic guided vehicle, or the distance between the automatic guided vehicle and the magnetic pointer unit.

18. The controlling method of the automatic guided vehicle as claimed in claim 15, wherein the identification data is denoted by proportional mode.

\* \* \* \* \*